(12) United States Patent
Thomas

(10) Patent No.: US 10,556,376 B2
(45) Date of Patent: Feb. 11, 2020

(54) METHOD OF MAKING FORMING SCREENS

(71) Applicant: TREDEGAR FILM PRODUCTS CORPORATION, Richmond, VA (US)

(72) Inventor: Paul Eugene Thomas, Terre Haute, IN (US)

(73) Assignee: TREDEGAR FILM PRODUCTS CORPORATION, Richmond, VA (US)

(*) Notice: Subject to any disclaimer, the term of this patent is extended or adjusted under 35 U.S.C. 154(b) by 326 days.

(21) Appl. No.: 15/023,595

(22) PCT Filed: Sep. 19, 2014

(86) PCT No.: PCT/US2014/056551
§ 371 (c)(1),
(2) Date: Mar. 21, 2016

(87) PCT Pub. No.: WO2015/042394
PCT Pub. Date: Mar. 26, 2015

(65) Prior Publication Data
US 2016/0207246 A1    Jul. 21, 2016

Related U.S. Application Data

(60) Provisional application No. 61/880,044, filed on Sep. 19, 2013.

(51) Int. Cl.
*B29C 51/36* (2006.01)
*C25D 1/08* (2006.01)
*C25D 3/12* (2006.01)

(52) U.S. Cl.
CPC .............. *B29C 51/365* (2013.01); *C25D 1/08* (2013.01); *C25D 3/12* (2013.01); *B29K 2905/08* (2013.01); *B29K 2905/10* (2013.01)

(58) Field of Classification Search
CPC .................................................. B29C 51/365
See application file for complete search history.

(56) References Cited

U.S. PATENT DOCUMENTS

| | | | | |
|---|---|---|---|---|
| 2,221,562 A | * | 11/1940 | Wernlund | C25D 5/12 205/176 |
| 2,226,384 A | | 12/1940 | Norris | |
| 3,957,414 A | | 5/1976 | Bussey, Jr. et al. | |
| 4,033,831 A | * | 7/1977 | Bakewell | C25D 1/08 101/128.4 |
| 4,317,792 A | | 3/1982 | Raley et al. | |
| 4,383,896 A | | 5/1983 | Pruyn et al. | |
| 4,456,570 A | | 6/1984 | Thomas et al. | |

(Continued)

FOREIGN PATENT DOCUMENTS

| | | | | |
|---|---|---|---|---|
| GB | 2150596 A | * | 7/1985 | ............... C25D 1/08 |
| GB | 2150596 A | | 7/1985 | |

(Continued)

OTHER PUBLICATIONS

Machine Translation of JP-07105864-A (Year: 1995).*

(Continued)

*Primary Examiner* — Daniel McNally
(74) *Attorney, Agent, or Firm* — Karceski IP Law, PLLC

(57) ABSTRACT

A process of constructing a forming screen through metal deposition in a nonconductive preform structure to achieve a desired aspect ratio of the forming screen thickness to open area.

9 Claims, 8 Drawing Sheets

(56) References Cited

U.S. PATENT DOCUMENTS

| | | | |
|---|---|---|---|
| 4,496,434 A | 1/1985 | Morssinkhof | |
| 5,282,951 A | 2/1994 | Delmee et al. | |
| 5,523,543 A * | 6/1996 | Hunter, Jr. | G01J 1/4257 219/121.62 |
| 5,766,441 A * | 6/1998 | Arndt | B05B 1/34 205/122 |
| 6,019,784 A | 2/2000 | Hines | |
| 7,364,687 B2 | 4/2008 | Maschino et al. | |
| 2003/0026697 A1 | 2/2003 | Subramanian et al. | |
| 2004/0247833 A1 * | 12/2004 | Copat | A61F 13/15731 428/156 |
| 2006/0066659 A1 * | 3/2006 | Giovanola | B41J 2/1404 347/20 |
| 2007/0134908 A1 | 7/2007 | Banham et al. | |
| 2011/0236831 A1 * | 9/2011 | Hasegawa | C07C 69/54 430/285.1 |

FOREIGN PATENT DOCUMENTS

| | | |
|---|---|---|
| JP | S61124600 A | 6/1986 |
| JP | 07105864 A * | 4/1995 |
| JP | H07105864 A | 4/1995 |
| JP | 2006193825 A | 7/2006 |
| JP | 2007070703 A | 3/2007 |
| JP | 2011219742 A | 11/2011 |

OTHER PUBLICATIONS

Chinese Office Action dated Jun. 27, 2017, for Chinese Patent Application No. 201480062867.8.
European Office Action dated Apr. 20, 2018, for European Patent Application No. 14781363.8.
Chinese Office Action dated Feb. 13, 2018, for Chinese Patent Application No. 201480062867.8.
Japanese Office Action dated Aug. 13, 2018, for Japanese Patent Application No. 2016-544019.
Chinese Office Action dated Oct. 31, 2018, for Chinese Patent Application No. 201480062867.8.
Japanese Office Action dated Feb. 21, 2019, for Japanese Patent Application No. 2016-544019.
Chinese Office Action dated Jun. 3, 2019, for Chinese Patent Application No. 201480062867.8.

* cited by examiner

METHOD OF MAKING FORMING SCREENS

CROSS-REFERENCE TO RELATED APPLICATIONS

This application is the National Stage Entry under 35 U.S.C. § 371 Patent Cooperation Treaty Application No. PCT/US2014/056551, filed Sep. 19, 2014, which claims the benefit of U.S. Provisional Application No. 61/880,044 filed Sep. 19, 2013, all of which are hereby incorporated by reference herein in their entirety.

FIELD OF THE INVENTION

The process herein is for the formation of forming screens used to make apertured polymeric films.

BACKGROUND OF THE INVENTION

Forming screens are perforated devices that are used to make apertured and embossed (unapertured) formed films. Apertured formed films are plastic films that are processed to create apertures or holes in the film. For three-dimensional films, the two most common processes are vacuum forming and hydroforming. The vacuum forming process, exemplified by references such as U.S. Pat. Nos. 3,957,414, 4,317,792 and 4,456,570, introduces a solid or molten plastic film onto a cylindrical forming screen that is rotating about a vacuum drum. In a hydroforming process, as exemplified by the reference U.S. Pat. No. 7,364,687, high pressure water jets are used to generate streams of liquid that impinge upon the film to create the three dimensional form and apertures.

In either the hydroforming or vacuum forming processes, the film is supported on a perforated structure known as a forming screen. Forming screens (also known in the art as "forming screens"), generally comprise a perforated cylinder. However, the forming screens may also take the form of a flat plate or flexible belt. The surface area of the forming screen surrounding the perforation is known as the "land" area.

One primary consideration in making metal screens is the amount of open area of the screen. With less solid area, the screens become weaker, less robust and more susceptible to breakage or distortion during use, and are more fragile to transport and handle.

To compensate for the loss of solid screen material with increased open area, it is generally desired to make a screen that has a high ratio of thickness to open area. By this is meant a comparison between the thickness of the forming screen in relation to the amount of open area in the screen. As the open area increases, the distance between the edges of adjacent openings decreases, which results in narrow land areas and a weaker screen. However, the strength of the screen can be increased by increasing the thickness of the screen.

A common problem in the art when trying to increase the thickness of the screen, especially in an electroplating process, is that the plating processes is non-specific in where the metal ions from the plating bath will be deposited as metal. Accordingly, while metal is being plated onto the outer surface to increase the thickness of the screen, metal is also being plated on the sidewalls forming the opening in the screen. Thus, as the thickness increases, the diameter of the openings in the screen will decrease. Subsequent processing steps (such as etching, drilling, laser engraving, etc.) are thus needed to increase the size of the opening of the screen back to its desired size. Therefore, it has been an objective in the art to have a process that provides screens having a relatively high thickness to open area ratio and a relatively high aspect ratio.

In an effort to address this need, plating processes have been proposed using specialized plating baths that are formulated or controlled to preferentially deposit metal so as to preferentially increase screen thickness and minimize the deposit of metal on the walls defining the aperture of the screen. Such processes are generally taught in U.S. Pat. Nos. 2,226,384, 4,383,896, 4,496,434, and 5,282,951. However, despite the improvements that these references provide, such processes have not eliminated the deposition of metal on the interior of the walls defining the opening, and thus have not eliminated the problems in the prior art to achieve the high thickness to open area ratio or a high aspect ratio.

There is a need for a process of making metal screens that have a relatively high thickness to open area ratio and a relatively high aspect ratio in a simple, controlled and low cost process.

SUMMARY OF THE INVENTION

The present application relates to a process of making a forming screen; providing a metal layer; bonding an engravable material to the metal layer; the engravable material having an engravable material inner surface, an engravable material outer surface and an engravable material thickness; engraving a predetermined pattern into the engravable material thickness to form a continuous, interconnected network of channels, said continuous interconnected network of channels comprising a negative space within the engravable material to expose the metal layer and creating a plurality of discrete formations bonded to the metal layer, thereby creating a pre-form; at least partially filling the continuous, interconnected network of channels of the pre-form with metal to a predetermined depth; thereby creating a metallized pre-form; the metallized pre-form comprising a metallic lattice, a plurality of discrete formations, a metal layer and a metallized pre-form external surface, the metallized pre-form external surface comprising the metallic lattice and the plurality of discrete formation; the metallic lattice comprising metallic lattice x-axis segments interconnected with metallic lattice y-axis segments and said plurality of discrete formations encompassed by the metallic lattice; removing the discrete formations from the metallized pre-form to create a screen precursor; said screen precursor comprising said metallic lattice and the metal layer; wherein metallic lattice encompasses a plurality of voids, said voids comprising negative space corresponding to the discrete formations of the metallized pre-form; and removing the metallic lattice from the metal layer of the screen precursor, thereby creating a forming screen.

DETAILED DESCRIPTION OF THE INVENTION

Figure 1:
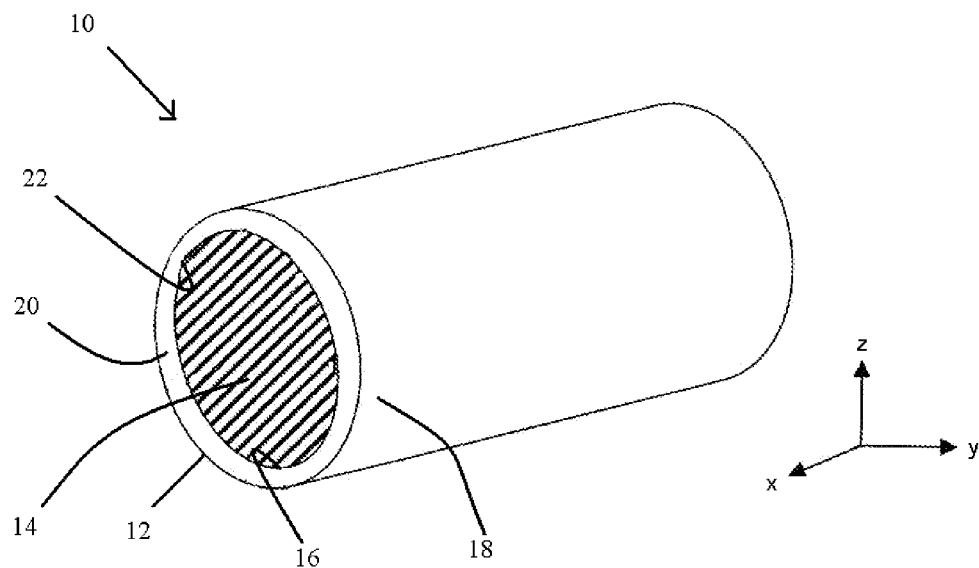
FIG. 1 is a perspective view of a cylindrical base substrate.

Forming screens (also known in the art as "forming screens"), generally comprise a metallic lattice comprised of a plurality of x-axis segments and a plurality of y-axis segments that intersect and a plurality of openings or voids encompassed by the intersecting x-axis segments and y-axis segments, the metallic lattice comprising a first surface plane and a second surface plane having a distance between the two planes defining a thickness of the metallic lattice. The opening or voids extend through the thickness of the metallic lattice from the first surface plane to the second surface plane. The term "open area" refers to the area of the screen that is occupied by the openings in the screen. It will be appreciated that as the percentage of open area in the screen increases, the percentage of solid area (x-axis segments and y-axis segments) in the screen decreases. For example, a screen having 20% open area has 80% solid area, whereas a screen with 80% open area has only 20% solid area remaining. Other suitable open area percentages is 20, 21, 22, 23, 24, 25, 26, 27, 28, 29, 30 and 40% open area.

The process of making a forming screen herein includes modifying structural components to form a pre-form in which a metallic lattice is constructed and then removed therefrom, thereby creating a forming screen.

Process of Making the Forming Screen

A step of the process is proving a base substrate 10 or 24 comprising a metal layer 12 and a support member 14 or 23. The metal layer 12 is applied to and in contact with the support member 14 or 23. As used herein, "in contact" are one or more components in close proximity to one another and adjacent to one another. The phrase is not to be understood, however, as requiring direct physical contact. Instead, the layers may be separated by a layer of adhesive, release film, or other functional layer may be present but the layers would still be deemed "in contact" even though physically separated from one another by the functional layer. The base substrate 10 or 24 provides a structural component that serves as the building platform that can be further manipulated to provide the pre-form in which the apertured forming screen results.

Metal Layer

The metal layer 12 may be any shape suited for the particular application. The metal layer 12 comprises a metal layer inner surface 16 and a metal layer outer surface 18 opposite the metal layer inner surface 16 disposed in a spaced-apart, generally parallel relationship to one another defining a metal layer thickness 20. The metal layer thickness 20 will depend on the particular process embodiment and the type of metal being used to make the apertured forming screen. The metal layer 12 may comprise a metal that is suitably conductive for the filling step later described and wherein the metal can be removed from the resulting metal lattice as described below. Suitable metals include steel, zinc, copper, aluminum, and mixtures thereof, with copper being preferred.

As shown in FIG. 1, a cylindrical embodiment of the base structure 10 is shown wherein the metal layer 12 comprises a metal layer inner surface 16 and a metal layer outer surface 18 with a metal layer thickness 20 there between. The metal layer inner surface 16 is in contact with the support member outer surface 22.

Figure 2:
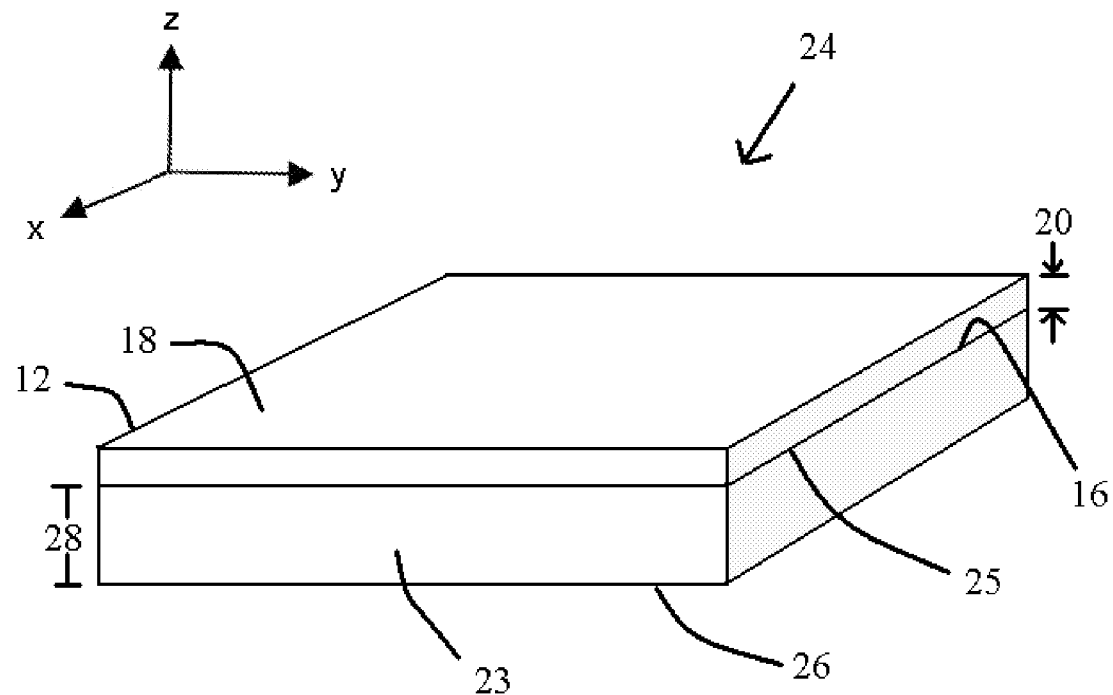
FIG. 2 is a magnified perspective view of a planar base substrate.

As shown in FIG. 2, a planar embodiment of the base structure 24 is shown wherein the metal layer 12 comprises a metal surface inner surface 16 and a metal layer outer surface 18 with a metal layer thickness 20 there between. The metal layer inner surface 14 is in contact with the support member outer surface 25.

The metal layer thickness 20 enables the apertured forming screen to be separated from the base substrate 10 and is between about 0.001 inch (25.4 microns) to 0.125 inch (3.18 mm) in thickness. If the base substrate 10 is cylindrical in form and the support member 14 is of uniform diameter such as the shown in FIG. 1, then only a few thousandths of an inch may be preferred for the metal layer thickness 20. If the base substrate 24 is a planar shape, as seen in FIG. 2, the metal layer 12, may be selected to be thicker, particularly if the base substrate 24 is made in a planar shape and then rolled afterward to form a hollow cylinder or hollow tube structure.

The metal layer 12 acts as an electrical conduit for the deposition of metal ions in a later filling step. Accordingly, it is believed that the metal layer 12 needs sufficient mass to be able to draw the metal ions, but the amount of mass will be determined by the particular processing conditions for the filling step. If electroplating is utilized in the filling step, conditions such as the ion concentration in the plating bath, the amount of energy (i.e., electrical current) applied to the plating process, and other variables should factor into the metal layer thickness 20. Those skilled in the art of metal plating will be able to determine the acceptable thickness for the metal layer thickness 20 based on a given set of plating conditions, or conversely determine the suitable plating conditions based on a given thickness of the metal layer thickness. Finally, from a practical perspective, the metal layer thickness 20 should be as thin as possible to achieve plating results and keep the costs of manufacture low.

The Support Member

The support member 14 of FIG. 1 is cylindrical in shape, such as a mandrel commonly used in electroplating bath applications. The support member 14 comprises a support member outer surface 22 as shown in FIG. 1. The support member 23, as shown in FIG. 2, may also comprise a support member inner surface 26 and a support member outer surface 25, with a support member thickness 28 there between that can be seen in FIG. 2. The support member 23 may also comprise a support member inner surface 26 and a support member outer surface 25, with a support member thickness 28 there between is orientated in a cylindrical shape such that the support member inner surface 26 encompasses a void in the middle of the cylindrical shape. In another embodiment, the support member 14 may comprise a support member outer surface 22 and be a solid cylindrical structure. The support layer 23 shown in FIG. 2 shows a planar support member 23. The support member 23 has a support member inner surface 26 and a support member outer surface 25 that is opposite the support member inner surface 26 and spaced apart by the support member thickness 28.

The base substrate 10 may also be an expandable mandrel commonly used in electroplating bath applications. The mandrel may be expanded in the radial direction to increase the diameter cross-section (z-y plane) of the support member.

A step in the present process is to place a metal layer 12 in contact with a support member 14 or 23. With reference to FIG. 1, the metal layer 12 is seen in contact with to a support member 14. The support member 14 of FIG. 1 is a cylindrical support, such as a mandrel to which the metal layer 12 is placed into contact. The embodiment of FIG. 1 is preferred and likely to be the most practical for commercial applications, as most commercial processes use a cylindrical apertured forming screen. However, it is also possible to have the base substrate 24 in a planar form and then fabricating a cylindrical structure therefrom.

In contacting the metal layer 12 with the support member 14 or 23 to form the base substrate 10 or 24, the outer surface of the support member 22 or 25 is in contact with the metal layer inner surface 16. In embodiments where the support member 14 has a cylindrical shape, such as of FIG. 1, the metal layer 12 may be applied by wrapping a metal piece having the metal layer thickness 20 around the outside of the support member 14 and against the support member outside surface 22.

In one embodiment, the metal layer 12 may comprise contacting a metal ribbon (the length of the metal film is substantially longer than the width of the metal film) having a metal layer thickness 20 with the support member outer surface 22 successively and in an overlapping fashion across the support member 14 in the y-axis direction to cover the entire support member outer surface 22 wherein at least some portion of the metal ribbon overlaps. Alternatively, a sheet of metal with the metal layer thickness 20 and having the same y-axis dimension as the support member 14 and approximately the length to encompass the diameter of the support member 14, is in contact with the support member outer surface 22 such that the ends of the sheet of metal overlap. In either case, the overlapping portion of the metal piece is bonded to another portion of the metal piece via welding, braising or otherwise securing to prevent the metal piece from unwrapping from the support member outer surface 22. It is also possible to fashion a hollow cylinder out of metal piece and bring it into contact with the support member 14 by sliding the metal layer 12 over the support member 14.

The length and width, or x-axis dimension and y-axis dimension, respectively, of the support member 14 or 23 will be determined by the particular application for the apertured forming screen. For example, if the apertured forming screen is ultimately to be used to make apertured films in webs that are 2 meters wide, the apertured forming screen will need to be at least 2 meters in length. Accordingly, the support member 14 and 23 would also need to be at least 2 meters in length (measured in the x-axis direction) to make the apertured forming screen. Likewise, if a vacuum drum used with the apertured forming screen in a vacuum forming line, if the drum is 1 meter in diameter, the width or the cross-section dimension in the z-y plane of the support member 23 will also be about 1 meter. These considerations also hold true for length and width (x- and z-y plane dimensions, respectively) for the metal layer 12.

In the embodiments shown in FIGS. 1 and 2, the metal layer 12 is shown to be co-extensive with the support member 14 or 23, but this is not required. In particular, the support member 14 or 23 can be longer in length than the metal layer 12. Likewise, in the planar embodiment of FIG. 2, the metal layer 12 can be narrower in width than the support member 23. While, as noted, the length and width of the metal layer 12 need not be coextensive with the length and width of the support member 14 or 23, it is not desirable for the length of the metal layer 12 to exceed the length or width of the support member 14 or 23.

Figure 3:
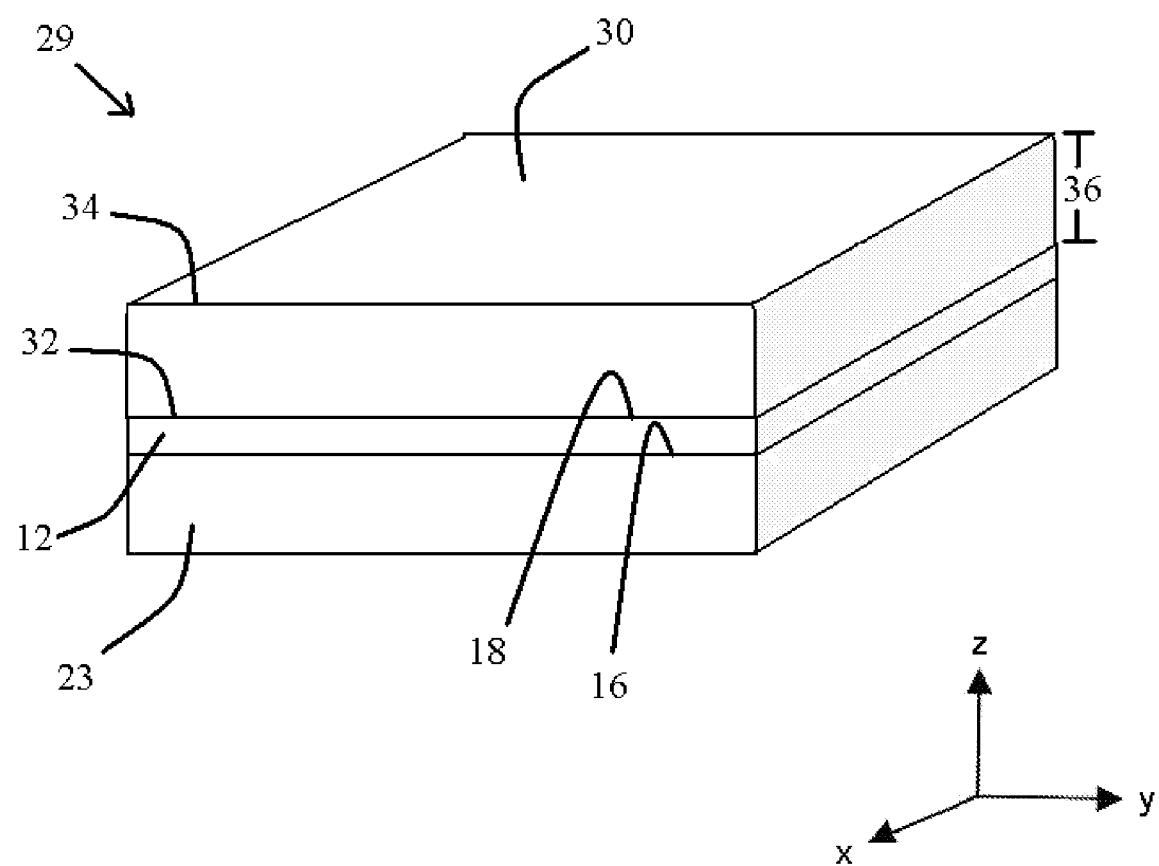
FIG. 3 is a magnified perspective view of an engravable substrate.

Bonding a Layer of Engravable Material to the Base Substrate to Form an Engravable Substrate A step in the present process includes bonding an engravable material 30 to the metal layer 12 of the base substrate 10 to form an engravable substrate 29. As can be seen in FIG. 3, the layer of engravable material 30 has an engravable material inner surface 32 and an engravable material outer surface 34 and an engravable material thickness 36 there between. The engravable material 30 is generally in the x-y dimensions (length and width) similar to the x-y dimensions (length and width) desired for the apertured forming screen.

The engravable material inner surface 32 is bonded to the metal layer outer surface 18 so as to prevent relative movement between the engravable material 30 and the metal layer 12. While not illustrated in the Figures, a layer of adhesive is preferably used to bond the layer of engravable material 30 to the metal layer 12. Cyanoacrylate adhesives are preferred.

The engravable material 30 is comprised of one or more substances that are capable of being engraved using a collimated energy beam, most preferably a laser beam. In addition, the engravable material 30 needs to be an electrical insulator that would not be oxidized in an electrodeposition process or, more specifically, it must not lose electrons to metal ions during the filling step discussed further below. Suitable substances that may be used to make the layer of engravable material 30 include non-conductive thermoplastic resins such as polypropylene, acetal resins, thermoset resins such as cross-linked polyesters, or epoxies. Preferably, the substance used for the layer of engravable material 30 is an acetal resin which can be purchased under the DELRIN® brand sold by DuPont®.

Figure 4:
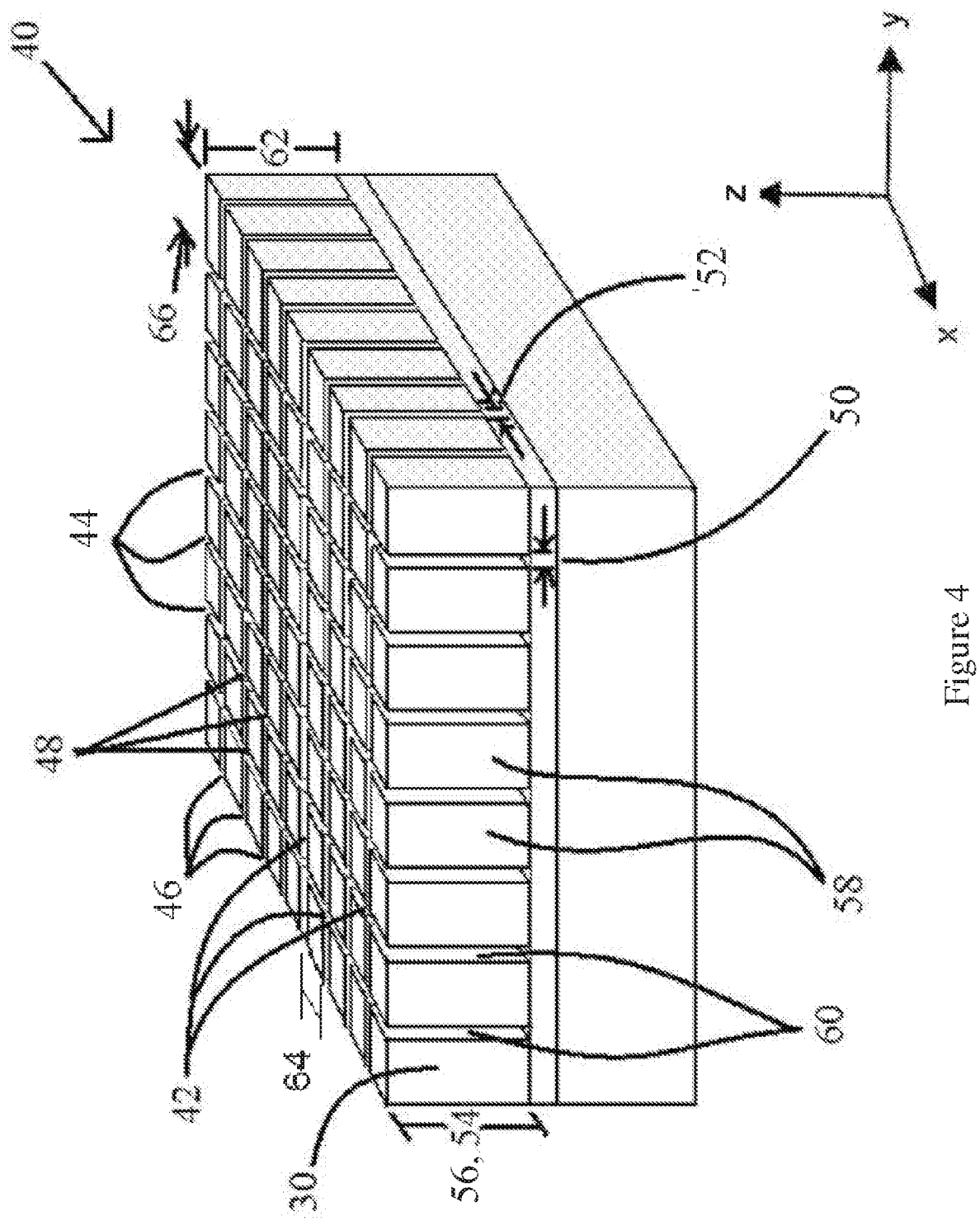
FIG. 4 is a magnified perspective view of pre-form.

A step in the process is to engrave the engravable substrate such that the entire engravable material thickness 36 is removed in a predetermined pattern to expose the metal layer outer surface 18 of the base substrate 10 to form a pre-form 40 shown in FIG. 4. The engravable material 30 is engraved by a collimated energy beam to remove the engravable material thickness 36 such that the engravable material 30 remaining in the pre-form 40 is surrounded by a continuous, interconnected network of channels 42 where the engravable material 30 was removed in the engraving step.

The continuous, interconnected network of channels 42 is comprised of a plurality of x-axis channels 44 that extend in the x-axis direction and a plurality of y-axis channels 46 that extend in the y-axis direction. In the particular embodiment of FIG. 4, the x-axis channels 44 are generally parallel and spaced apart from one another, and the y-axis channels 46 are also spaced apart and generally parallel to one another. Because the x-axis channels 44 are oriented in a direction that is generally perpendicular to the y-axis channels 46, x-axis channels 44 intersect with the y-axis channels 46 at periodic intervals at intersecting points 48. These intersecting points 48 provide for the x-axis channels 44 to be connected to y-axis channels 46. This is what is meant by the term "interconnected." Thus, the term "continuous" when used to refer to the network of channels 42 connotes the uninterrupted ability to travel from any one point in the x-y plane of the network of channels 42 to any other point within the x-y plane of the network of channels 42 by following a pathway through x-axis channels 44 and/or y-axis channels 46 without leaving the x-y plane of the network of channels 42 or the x-y plane of the x-axis channels 44 or the y-axis channels 46.

With reference to FIG. 4, the x-axis channels 44 are seen extending in the x-axis direction and y-axis channels 46 are seen extending in a y-axis direction. The continuous interconnected network of channels 42 will define at least the x-axis and y-axis dimensions of the apertured forming screen. Accordingly, the x-axis channels 44 will advantageously extend in the x-axis direction to substantially correspond with the final desired x-axis dimension of the forming screen and the y-axis channels 46 will advantageously extend in the y-axis direction to substantially correspond to the final desired y-axis dimension of the forming screen. In this context, the term "substantially correspond" is used to indicate that the network of channels 42 need not extend in the x-axis dimension and the y-axis dimension to correspond exactly to the final desired dimension of the apertured forming screen, as further processing can change those final dimensions if desired.

The embodiment of FIG. 4 shows the continuous interconnected network of channels 42 as being a simple square or rectangular grid pattern. It is to be understood that the other configurations are possible and that the invention is not limited to the particular pattern of network of channels 42 illustrated. In fact, as is known in the forming screen art, a wide variety of shapes and patterns are used to make apertured films for topsheets, including square, rectangular, boat shaped, triangles, polygonal, hexagonal, polygonal, circular, oval, cat eye shaped, crescent shaped, etc. as well as combinations thereof. Any desired pattern for the network of channels 42 can be used in the process of this disclosure. It is also know in the art to use screens having a pattern of apertures having non-uniform spacing, shape and size as well as a "pattern" that is purely randomly in terms of spacing, shape and size of aperture. While the embodiment in FIG. 4 shows that the x-axis channels width 50 and y-axis channels width 52 are relatively constant, this is not a necessary feature of the disclosure and other embodiments where the x-axis channels 44 and/or y-axis channels 46 have varied widths (50 and 52, respectively) are also envisioned. Indeed varied widths (50 and 52) would result when the discrete formations 58 had a circular, oval, crescent shaped, boat shaped or other symmetrical and nonsymmetrical shapes.

The continuous, interconnected network of channels 42 are of a thickness (depth) substantially similar to the engravable material thickness 36 such that the metal layer outer surface 18 is exposed. X-axis channels have a thickness 54 and Y-axis channels have a thickness 56.

As can be seen in FIG. 4, the engraving step therefore creates a plurality discrete formations 58 of engravable material 30 bonded to the metal layer outer surface 18. Accordingly, each of the discrete formations 58 is a stand-alone structure separated from the other discrete formations 58 by multiple x-axis channels 44 and multiple y-axis channels 46 such that each discrete formation 58 is isolated from an adjacent discrete formation 58 in the x-axis direction by y-axis channels 46 and in the y-axis direction by x-axis channels 44. Accordingly, the term "discrete" is used herein in to refer to the separated, isolated, and stand-alone and unconnected character of the discrete formations 58.

Each of the discrete formations 58 has a one or more discrete formation sidewall 60 that extend from the metal layer outer surface 18 to the engravable material outer surface 34 by the discrete formation sidewall height 62. The discrete formation comprises a discrete formation length 64 and a discrete formation width 66. The z-axis direction of the sidewalls 60 is equal to the engravable material thickness 36 prior to the engraving step and is also equal to the z-axis dimension (height) of x-axis channels 44 and y-axis channels 46. The distance between the discrete formation sidewall 60 and the discrete formation sidewall 60 of an adjacent discrete formation 58 is defined by the x-axis dimension of the y-axis channel 46 (y-axis channel width 52) or the y-axis dimension of the x-axis channel 44 (x-axis channel width 50).

A step in the process is to at least partially fill the continuous, interconnected network of channels 42 of the pre-form 40 with a metal to a predetermined depth; thereby creating a metalized pre-form 67.

Figure 5:
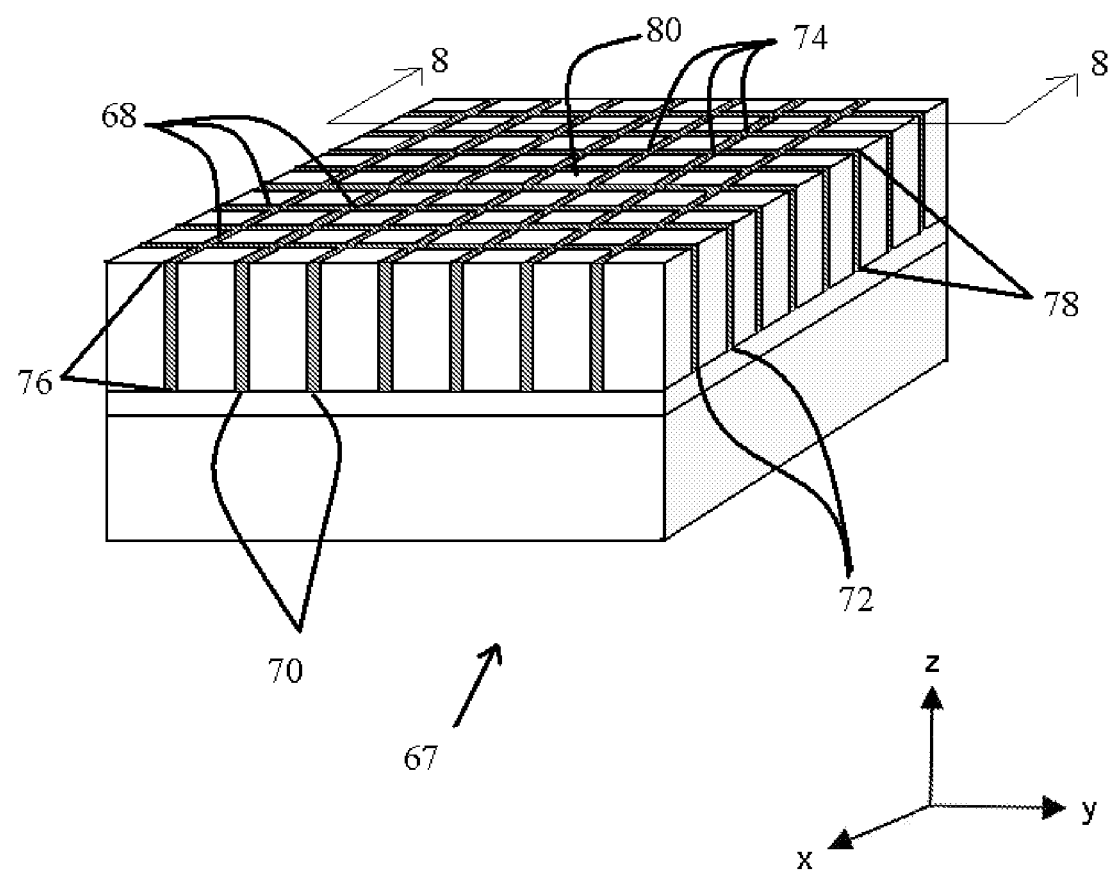
FIG. 5 is a magnified perspective view of a metalized pre-form.

The metalized pre-form 67 shown in FIG. 5 comprises a metallic lattice 68 comprising metallic lattice x-axis segments 70 interconnected with metallic lattice y-axis segments 72 at metallic lattice intersection points 74 and the plurality of discrete formations 58 are encompassed by said metallic lattice 68. The metallic lattice x-axis segments 70 correspond to the x-axis channels 44 of the pre-form 40, the metallic lattice y-axis segment 72 correspond to the y-axis channels 46 of the pre-form 40 and the metallic lattice intersection points 74 corresponds to the intersecting points 48 of the pre-form 40.

The metallic lattice x-axis segments 70 extend in the x-axis direction and are oriented generally parallel to one another across the width of the metalized pre-form 67. The metallic lattice x-axis segments 70 are spaced apart from one another in the y-axis direction by the discrete formations width 66. The width (thickness) of the metallic lattice x-axis segments 70 is equal to the x-axis channels width 50 of the pre-form 40.

The metallic lattice y-axis segments 72 extend in the y-axis direction and are oriented generally parallel to one another across the length of the metalized pre-form 67. The metallic lattice y-axis segments 72 are spaced apart from one another in the x-axis direction by the discrete formations length 64. The width of the metallic lattice y-axis segments 72 is equal to the y-axis channels width 52 of the pre-form 40.

The metallic lattice x-axis segments height 76 and the metallic lattice y-axis segments height 78 can be equal to, less than, or slightly greater than the discrete formations sidewall height 62. It is generally preferred that the metal completely fill the x-axis channels 44 and the y-axis channels 46 of the pre-form 40 such that the metallic lattice x-axis segments height 76 and the metallic lattice y-axis segments height 78 are the same as the discrete formation sidewall height 62. The metallic lattice x-axis segments height 76 and the metallic lattice y-axis segments height 78 may also be slightly greater than the discrete formation sidewall height 62 as the metal may tend to protrude above the discrete formations sidewall height 62. The metallic lattice x-axis segments height 76 need not be the same as the metallic lattice y-axis segments height 78. If desired, the metallic lattice y-axis segments height 78 can be less than the metallic lattice x-axis segments height 76 or vice versa.

Metal

Suitable metal for the filling step includes metals that are capable of forming metal salts, those metal salts are then capable for being deposited by the filling step (described below) onto the metal layer of the pre-form. Suitable metals include steel (iron), zinc, copper, aluminum, and mixtures thereof, with nickel being preferred. Suitable metal sales include zinc salts, copper salts, aluminum salts, nickel salts, iron salts and mixtures thereof.

Filling Step

In a preferred embodiment, the process used to make the metalized pre-form 67 from the pre-form 40 is an electroplating process. In an electroplating process, the entire pre-form 40 would be submerged into a bath containing a solution of dissolved metal salts (metal ions), most preferably nickel salts, and optionally other dissolved electroplating aid materials. The submerged pre-form 40 would then be energized. By "energized" we mean that an electric current would be applied to at least the metal layer 12, so as to exchange ions with the dissolved metal salts in the electroplating bath. Because the discrete formations 58 comprise engravable material 30, which exchanges electrons less readily than metal layer 12 (i.e., the engravable material 30 is acting as an insulator), the electrical current applied to the metal layer 12 will not cause the discrete formations 58 to lose ions in the electroplating process. Thus, no metal will be deposited on the discrete formation sidewalls 60. As a result, during the electroplating step, metal will be selectively deposited in the x-axis channels 44 and y-axis channels 46 of the pre-form 40 such that the resulting metallic lattice 68 has the same general appearance, size and shape as the interconnected network of channels 42 of the pre-form 40.

It is generally preferred that the metal be deposited during this step in such a way that the metal builds upon the metal layer outer surface 18 which is exposed via the x-axis channels 44 and the y-axis channels 46 in the pre-form 40 in a uniform manner. In this way, the metallic lattice x-axis segments 70 and the metallic lattice y-axis segments 72 will be created simultaneously and at a near equal rate. Such a process will ensure that the metallic lattice x-axis segments height 76 and the metallic lattice y-axis segments height 78 will be approximately equal to one another. Moreover, in such a process the metallic lattice x-axis segments height 76 and the metallic lattice y-axis segments height 78 can be controlled by leaving the pre-form 40 in the electroplating bath until the metallic lattice x-axis segments height 76 and the metallic lattice y-axis segments height 78 reaches the desired height and therefore the desired apertured forming screen thickness 92 (see FIG. 7).

Those skilled in the art will appreciate that there are limitations on the electroplating process itself that must be respected. In particular, the type of metal ions in the bath; the concentration of the metal ions; the amount of energy applied to the process; the amount of surface area to be plated; any electroplating aid materials, etc. all must be taken into account to achieve the desired results.

There are limitations inherent in the electroplating process which will restrict the aspect ratio of any forming screen land areas 94 that can be created using the process. The term "aspect ratio" refers to the relationship between the metallic lattice x-axis segment height 76 and the metallic lattice y-axis segments height 78 and the width of the metallic lattice x-axis segments 50 (measured in the y-axis direction) or width of the metallic lattice y-axis segment 52 (measured in the x-axis direction). The concept of the aspect ratio is discussed in more detail below in connection with FIG. 7.

After the metallic lattice x-axis segments 70 and metallic lattice y-axis segments 72 have reached the desired heights, the electrical current is turned off and the metalized pre-form 67 is removed from the electroplating bath. As noted above, the metallic lattice x-axis segment height 76 and/or metallic lattice y-axis segment height 78 may protrude above the discrete segment sidewall height 62. If so, the metal can be removed by grinding or other suitable method, such that the metalized pre-form 67 comprises a uniform metalized pre-form external surface 80. The term "uniform" means that the metallic lattice x-axis segment height 76 and/or metallic lattice y-axis segment height 78 is co-planar with the discrete formation sidewall height 62.

Alternative filling steps may include injecting liquid metal into the interconnected network of channels 42, casting liquid metal into the interconnected network of channels 42, or applying a plasma spray of metal might also be utilized, for example, as processes to fill, or partially fill the interconnected network of channels 42 with metal.

Figure 6:
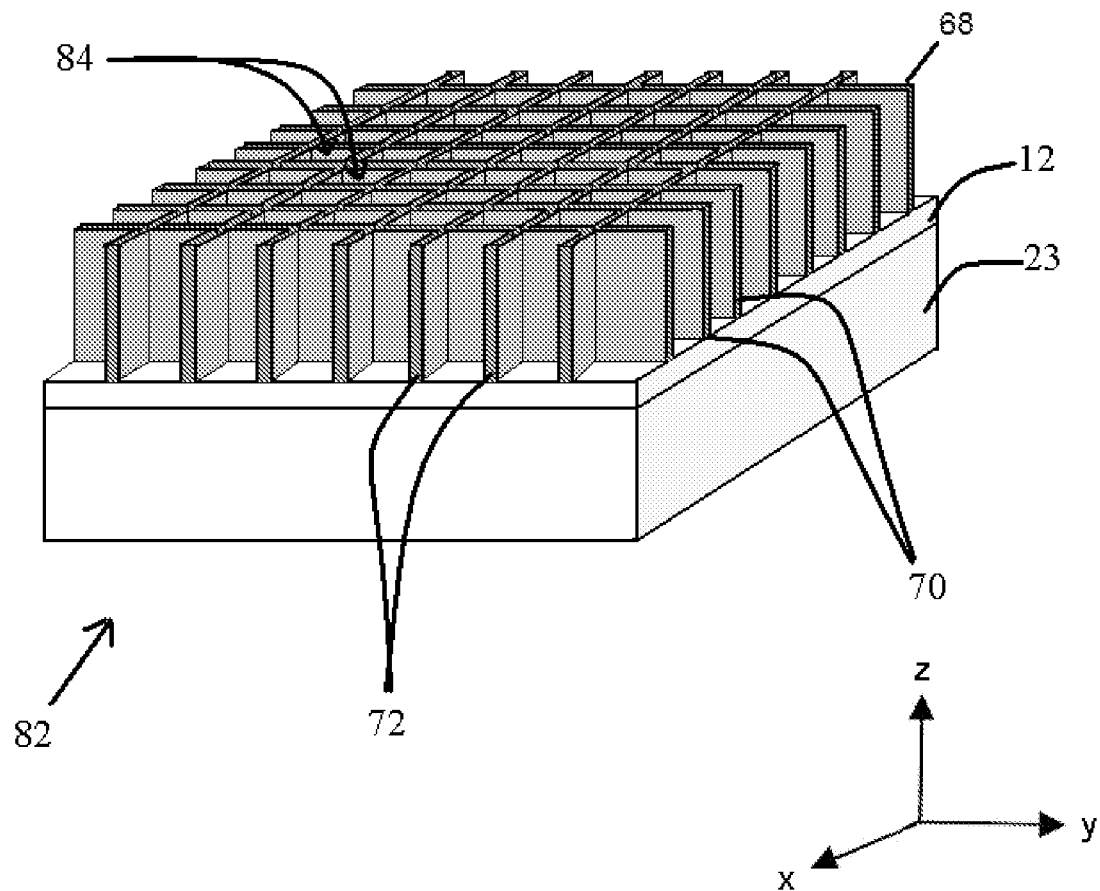
FIG. 6 is a magnified perspective view of a screen precursor.

A step in the process is the removal of the discontinuous, discrete formations 58 from the metalized pre-form 67 to create a screen precursor 82 which can be seen in FIG. 6. The screen precursor 82 comprises a metallic lattice 68; wherein the metallic lattice x-axis segments 70 and the metallic lattice y-axis segments 72 surround and define a plurality of voids 84, said voids 84 comprising negative space corresponding to areas previously occupied by the discrete formations 58 in the metalized pre-form 67. In a preferred embodiment, the discrete formations 58 will be dissolved using a suitable solvent. Mechanical or thermo-mechanical processes, such as drilling, scraping, ablation, heating, melting, etc., can be used to remove the discrete formations 58 from the metalized pre-form 67.

Figure 7:
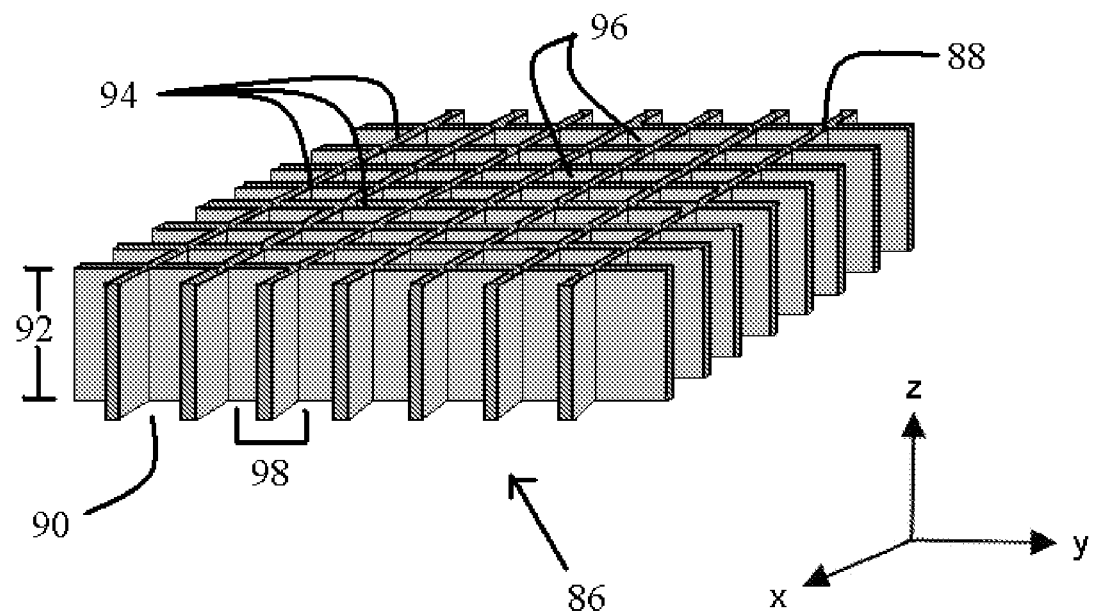
FIG. 7 is a magnified perspective view of a forming screen.

A step in the process is the removal of the metallic lattice 68 from the base structure 10 or 24 to form a forming screen 86 that can be seen in FIG. 7. A convenient and inexpensive way in which to separate the metallic lattice 68 from the metal layer 12 of the base structure 10 or 24 is to place the screen precursor 82 into an acid bath and etch away the metal layer 12. Etching away the metal layer 12 leaves a gap between the metallic lattice 68 and the support member 14 or 23 such that the metallic lattice 68 can be separated from the support member 14 or 23, resulting in the forming screen 86.

With reference to FIG. 7, the forming screen 86 has all the features of the metallic lattice 68 of the screen precursor 82. In particular, the forming screen 86 has a plurality of spaced-apart metallic lattice x-axis segments 70 and a plurality of spaced-apart metallic lattice y-axis segments 72 that intersect one another at metallic lattice intersection points 74, forming a generally rectangular pattern array. Forming screen 86 has a forming screen first surface plane 88 and a forming screen second surface plane 90 with a forming screen thickness 92 there between.

The voids 84 defined by the array of intersecting metallic lattice x-axis segments 70 and metallic lattice y-axis segments 72 is commonly referred to in the art as the screen aperture 96, whereas the metallic lattice x-axis segments 70 and metallic lattice y-axis segments 72 collectively are the forming screen land area 94. The distance between adjacent screen apertures 96, measured from the center of one screen aperture 96 to the center of an adjacent screen aperture 96 (represented by reference numeral 98 in FIG. 7) defines the center-to-center spacing or "mesh" of the forming screen 86 (i.e., the number of aligned individual screen apertures within the space of one lineal inch). Forming screens 86 having a mesh of between about 9 and about 60 are generally advantageous in making apertured films for hygiene applications using the vacuum forming process.

The mesh may be determined by the combined linear dimensions (in the x-y plane) of the metallic lattice x-axis segment 70 width or the metallic lattice y-axis segment 72 width and the adjacent screen aperture 96. For example, if the width of the metallic lattice x-axis segment 70 is 0.005 inch (127 microns) and the diameter of the screen aperture 96 is 0.050 inch (1.27 mm), the center-to-center dimension 98 between adjacent screen apertures 96 is 0.055 inch (1.4 mm) 1 inch (25.4 mm) divided by 0.055 inch (1.4 mm) is 18 giving a mesh of 18.

The open area of the forming screen 86 is defined as the percentage that the total amount of area on the forming screen first surface plane 88 or the forming screen second surface plane 90 that is occupied by the screen apertures 96 compared to the total area of the forming screen first surface plane 88 or the forming screen second surface plane 90 (not both). A 70% open area for a forming screen 86 is generally considered a maximum amount of open area possible in a forming screen 86 that is robust enough to be useful in a commercial scale film manufacturing operation.

Forming screen land areas 94, comprises of the metallic lattice x-axis segments 70 and the metallic lattice y-axis segments 72 have a width in the range of 0.003 and 0.007 inch (76.2 microns-178 microns). The dimension across the screen aperture 96, measured in either the x-axis direction or the y-axis direction, is preferably 0.10 inch (2.54 mm) or less and preferably in the range of 0.015 to 0.10 inch (381 microns-254 microns).

The forming screen thickness 90 may be in the range of 0.017 to 0.115 inch (432 microns-2920 microns). The plate-up ratio, determined by dividing the forming screen thickness 90 by the width of the forming screen land area 94 is generally 16 or less and most preferably in the range of 3-16.

The metal density of the forming screen 86 is defined as the weight of metal per cubic inch of forming screen 86. The metal density of the forming screen 86 is greater than 0.21 pounds/cubic inch (0.0058 g/mm$^3$) and most preferably in the range of 0.22 to 0.32 pounds/cubic inch (0.0061-0.0089 g/mm$^3$).

Table 1 below contains exemplary numerical values for the forming screen features.

TABLE 1

| Land Width (inches) | Screen Aperture diameter (inches) | Forming screen Thickness (inches) | Plateup Ratio | Mesh | Open Area | Metal Density (lb/in$^3$) |
|---|---|---|---|---|---|---|
| 0.003 | 0.015 | 0.017 | 6 | 56 | 55% | 0.28 |
| 0.003 | 0.020 | 0.023 | 8 | 43 | 59% | 0.26 |
| 0.003 | 0.025 | 0.029 | 10 | 36 | 63% | 0.25 |
| 0.003 | 0.030 | 0.035 | 12 | 30 | 65% | 0.23 |
| 0.003 | 0.035 | 0.040 | 13 | 26 | 67% | 0.23 |
| 0.003 | 0.040 | 0.046 | 15 | 23 | 68% | 0.22 |
| 0.004 | 0.015 | 0.017 | 4 | 53 | 49% | 0.30 |
| 0.004 | 0.020 | 0.023 | 6 | 42 | 55% | 0.28 |
| 0.004 | 0.025 | 0.029 | 7 | 34 | 58% | 0.26 |
| 0.004 | 0.030 | 0.035 | 9 | 29 | 61% | 0.25 |
| 0.004 | 0.035 | 0.040 | 10 | 26 | 63% | 0.24 |
| 0.004 | 0.040 | 0.046 | 12 | 23 | 65% | 0.23 |
| 0.004 | 0.045 | 0.052 | 13 | 20 | 66% | 0.23 |
| 0.004 | 0.050 | 0.058 | 14 | 19 | 67% | 0.22 |
| 0.004 | 0.055 | 0.063 | 16 | 17 | 68% | 0.22 |
| 0.004 | 0.060 | 0.069 | 17 | 16 | 69% | 0.21 |
| 0.005 | 0.015 | 0.017 | 3 | 50 | 44% | 0.31 |
| 0.005 | 0.020 | 0.023 | 5 | 40 | 50% | 0.29 |
| 0.005 | 0.025 | 0.029 | 6 | 33 | 55% | 0.28 |
| 0.005 | 0.030 | 0.035 | 7 | 29 | 58% | 0.27 |
| 0.005 | 0.035 | 0.040 | 8 | 25 | 60% | 0.26 |
| 0.005 | 0.040 | 0.046 | 9 | 22 | 62% | 0.25 |
| 0.005 | 0.045 | 0.052 | 10 | 20 | 64% | 0.24 |
| 0.005 | 0.050 | 0.058 | 12 | 18 | 65% | 0.23 |
| 0.005 | 0.055 | 0.063 | 13 | 17 | 66% | 0.23 |
| 0.005 | 0.060 | 0.069 | 14 | 15 | 67% | 0.22 |
| 0.005 | 0.065 | 0.075 | 15 | 14 | 68% | 0.22 |
| 0.005 | 0.070 | 0.081 | 16 | 13 | 68% | 0.22 |
| 0.006 | 0.015 | 0.017 | 3 | 48 | 40% | 0.32 |
| 0.006 | 0.020 | 0.023 | 4 | 38 | 46% | 0.30 |
| 0.006 | 0.025 | 0.029 | 5 | 32 | 51% | 0.29 |
| 0.006 | 0.030 | 0.035 | 6 | 28 | 55% | 0.28 |
| 0.006 | 0.035 | 0.040 | 7 | 24 | 57% | 0.27 |
| 0.006 | 0.040 | 0.046 | 8 | 22 | 59% | 0.26 |
| 0.006 | 0.045 | 0.052 | 9 | 20 | 61% | 0.25 |
| 0.006 | 0.050 | 0.058 | 10 | 18 | 63% | 0.25 |
| 0.006 | 0.055 | 0.063 | 11 | 16 | 64% | 0.24 |
| 0.006 | 0.060 | 0.069 | 12 | 15 | 65% | 0.23 |
| 0.006 | 0.065 | 0.075 | 12 | 14 | 66% | 0.23 |
| 0.006 | 0.070 | 0.081 | 13 | 13 | 67% | 0.23 |
| 0.006 | 0.075 | 0.086 | 14 | 12 | 67% | 0.22 |
| 0.006 | 0.080 | 0.092 | 15 | 12 | 68% | 0.22 |
| 0.006 | 0.085 | 0.098 | 16 | 11 | 69% | 0.22 |
| 0.007 | 0.015 | 0.017 | 2 | 45 | 37% | 0.32 |
| 0.007 | 0.020 | 0.023 | 3 | 37 | 43% | 0.31 |
| 0.007 | 0.025 | 0.029 | 4 | 31 | 48% | 0.30 |
| 0.007 | 0.030 | 0.035 | 5 | 27 | 52% | 0.29 |
| 0.007 | 0.035 | 0.040 | 6 | 24 | 55% | 0.28 |
| 0.007 | 0.040 | 0.046 | 7 | 21 | 57% | 0.27 |
| 0.007 | 0.045 | 0.052 | 7 | 19 | 59% | 0.26 |
| 0.007 | 0.050 | 0.058 | 8 | 18 | 60% | 0.26 |
| 0.007 | 0.055 | 0.063 | 9 | 16 | 62% | 0.25 |
| 0.007 | 0.060 | 0.069 | 10 | 15 | 63% | 0.24 |
| 0.007 | 0.065 | 0.075 | 11 | 14 | 64% | 0.24 |
| 0.007 | 0.070 | 0.081 | 12 | 13 | 65% | 0.23 |
| 0.007 | 0.075 | 0.086 | 12 | 12 | 66% | 0.23 |
| 0.007 | 0.080 | 0.092 | 13 | 11 | 66% | 0.23 |
| 0.007 | 0.085 | 0.098 | 14 | 11 | 67% | 0.22 |
| 0.007 | 0.090 | 0.104 | 15 | 10 | 68% | 0.22 |
| 0.007 | 0.095 | 0.109 | 16 | 10 | 68% | 0.22 |
| 0.007 | 0.100 | 0.115 | 16 | 9 | 69% | 0.22 |

Multiplanar and Complex Patterned Forming Screen

An additional series of steps or multiple staged process steps may be used to create multiplanar forming screens, forming screens having complex patterns on the first plane, or aesthetic designs in the first plane of the forming screen. A "multiplanar forming screen" is a three-dimensional forming screen that may comprise a plurality of plateaus that extending from the first plane of the forming screen, the plateaus defining at least one additional plane (third plane) of the forming screen above the first plane, specifically on the land portions of the first plane of the forming screen.

In one embodiment, a second engravable material 102 is bonded to the metalized pre-form 67 before the removal of the discrete formations 58 to form the multiplanar base substrate 100.

In another embodiment, multiple segments of a second engravable material 102 are bonded to the metalized pre-form 67 before the removal of the discrete formations 58 to form a multiplanar base substrate 100.

Second Engravable Material

The second engravable material 102 has a second engravable material inner surface 104 and a second engravable material outer surface 106 and a second engravable material thickness 108 there between. In one embodiment, the second engravable material 102 is generally in the x-y dimensions (length and width) similar to the x-y dimensions (length and width) desired for the forming screen. In an alternate embodiment, the multiple segments of a second engravable material 102 is less than the x-y dimensions (length and width) of the x-y dimensions (length and width) desired for the forming screen, but are orientated on the metalized pre-form 67 such that the collective x-y dimensions of the multiple segments of the second engravable material 102 is similar to the x-y dimensions (length and width) desired for the forming screen.

Figure 8:
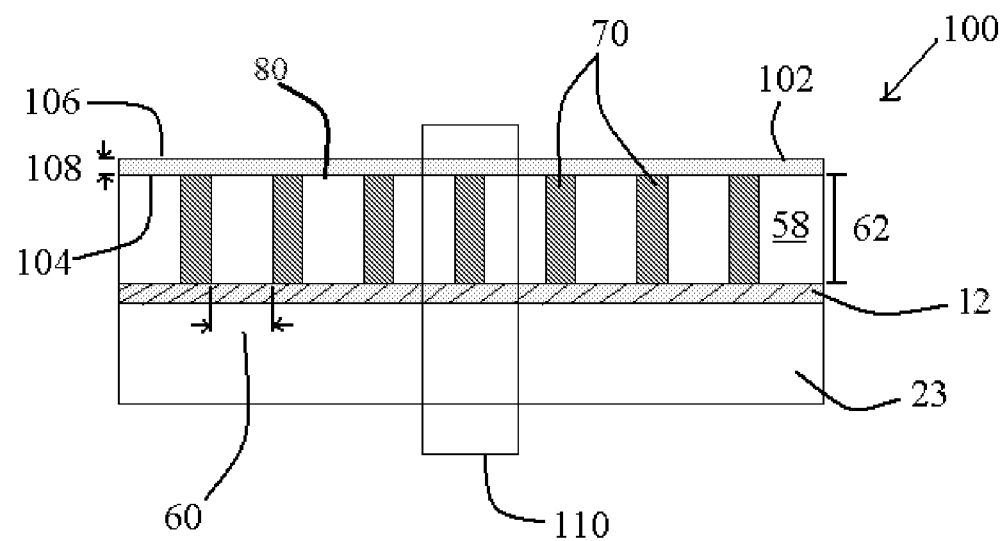
FIG. 8 is a magnified schematic view of a multiplanar substrate comprising a metalized pre-form taken along line 8-8 of FIG. 5 with a second engravable material.

As shown in FIG. 8, which is a cross-sectional view of the metalized pre-form 67 of FIG. 5 along 8-8, the second engravable material inner surface 104 is bonded to the metalized pre-form external surface 80 so as to prevent relative movement between the second engravable material 102 and the metalized pre-form external surface 80. The bonding method should not interfere with the filling step, described below. While not illustrated in the Figures, a layer of adhesive is preferably used to bond the second engravable material inner surface 104 to the metalized pre-form external surface 80. Cyanoacrylate adhesives are preferred.

The second engravable material 102 is comprised of one or more substances that are capable of being engraved using a collimated energy beam, most preferably a laser beam. In addition, the second engravable material 102 needs to be an electrical insulator that would not be oxidized in an electrodeposition process or, more specifically, it must not lose electrons to metal ions during the second filling step discussed further below. Suitable substances that may be used to make the second engravable material 102 include non-conductive thermoplastic resins such as polypropylene, acetal resins, thermoset resins such as cross-linked polyesters, or epoxies. Preferably, the substance used for the second engravable material 102 is an acetal resin which can be purchased under the DELRIN® brand sold by DuPont®.

Engraving

A step in the process is to engraving the multiplanar base substrate 100 starting from the second engravable material outer surface 106 such that the second engravable material thickness 108 is selectively removed to expose the metalized pre-form external surface 80, including the metallic lattice x-segments 70 and metallic lattice y-segments 72 to form a multiplanar pre-form 126. The second engravable material 102 is engraved by a collimated energy beam to remove the second engravable material thickness 108 such that the second engravable material 102 remaining after engraving encompasses multiple through-hole perforations 114, which can be seen represented in FIG. 9. The through-hole perforations 114 comprise a through hole first opening 116 on the second engravable material inner surface 104 and a through hole second opening 118 on the second engravable material outer surface 106. A bore 120 connects the through hole first opening 116 and the through hole second opening 118, whereby through-hole perforation 114 forms a negative space in the second engravable material 102 that extends through the second engravable material thickness 108.

The through-hole perforations 114 should align, at least in part, with the metallic lattice x-axis segments 70 and the metallic lattice y-axis segments 72 of the metalized pre-form 67. The alignment is required for the subsequent second filling step of the multiplanar pre-form 126 to provide a pathway for the electrical current needed for the ionic exchange in the second filling step and the resulting metal deposition.

While the through-hole perforations 114 are shown in the Figures as cylindrical in cross-section (x-y plane), it is to be understood that the cross-section of the through-hole perforations 114 may be of any desired size, shape of configuration. The through hole first opening 116 and the through hole second opening 118 can be of any desired cross-sectional (x-y plane) shape. For example, suitable cross-sectional shapes may be circular, elliptical, oval, square, triangular, hexagonal, octagonal, polygonal, boat shaped, crescent shaped, or other desired shape. Not all of the selected shapes need be the same as different shapes may be used if desired. In most embodiments, the through-hole perforations 114 will have a uniform cross-sectional shape such that the through hole first opening 116, the bore 120 and the through hole second opening 118 for a given through-hole perforation 114 will be the same in cross-sectional shape.

The number of through-hole perforations 114 per unit area of the second engravable material 102 can vary considerably depending on the desired properties in the forming screen and the three-dimensional film made therefrom.

Figure 9:
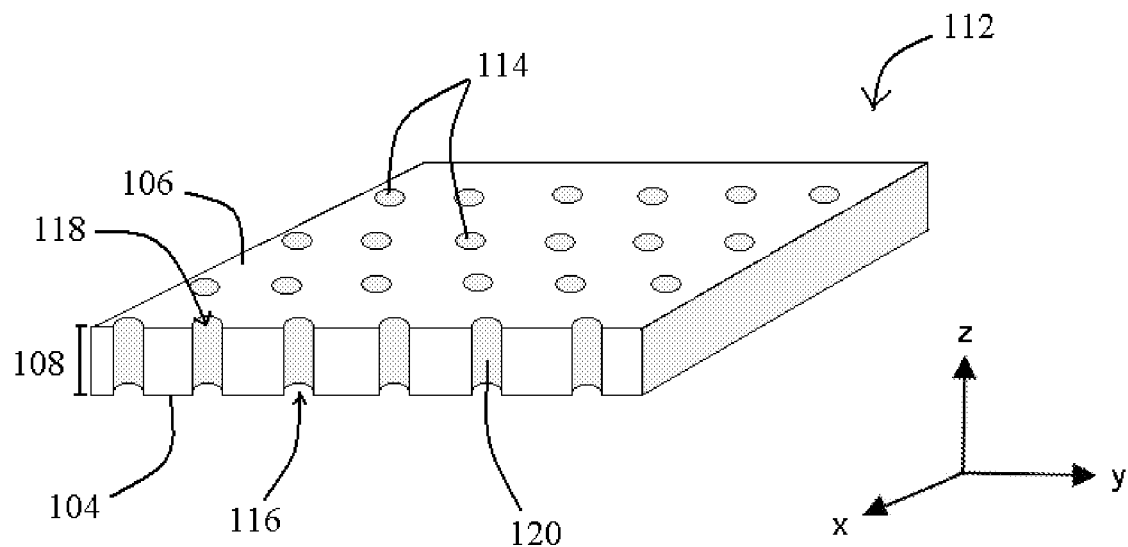
FIG. 9 a magnified perspective view of a pre-engraved second engravable material.

The bores 120 may be oriented perpendicular to the second engravable material inner surface 104 and the second engravable material outer surfaces 106 as illustrated in FIG. 9. However, the bores 120 may be present at angles between 10 degrees and −10 degrees with respect to the metalized pre-form outer surface 80. The bores 120 may be generally parallel to one another, but are not limited to being generally parallel.

In another embodiment, as shown in FIG. 9, a pre-engraved layer of a second engravable material 112 is formed, and then is bonded to the metalized pre-form 67 before the removal of the discrete formation of engravable material 58 to form the multiplanar pre-form 126.

Figure 10:
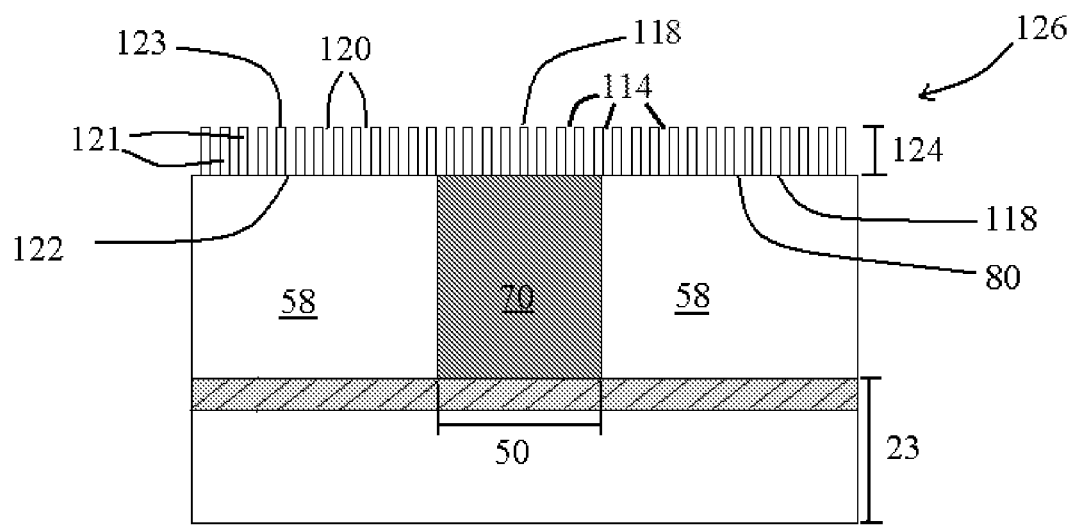
FIG. 10 is an enlarged schematic view of the area 110 in FIG. 8 of a multiplanar pre-form.

FIG. 10 is an enlarged schematic sectional view of area 110 in FIG. 8 after the engraving step is completed of the multiplanar pre-form 126. FIG. 10 shows the engraved second engravable material 121 bonded with the metalized pre-form 67. The engraved second engravable material 121 comprises an engraved second engravable material inner surface 122, an engraved second engravable material outer surface 123 and an engraved second engravable material thickness 124 there between. As can be seen in FIG. 10, through hole perforations 114 are aligned with the metalized pre-form external surface 80 at the metallic lattice x-axis segments 70 of the metalized pre-form 67 and some of the through hole perforations 114 are aligned with or in registration with the discrete formations 58. Alignment of the through hole perforations 114 are also with the metallic lattice y-axis segments 72 of the metalized pre-form 67, but are not shown in this enlarged sectional view of FIG. 10.

Thus, a multiplanar metallic lattice 134 (FIG. 12) or other metallic structure being formed on the metalized pre-form 67 would only form in areas where the current could pass through the metallic lattice 68 in the metalized pre-form 67 and attract metal ions into the though hole perforation 114 of the multiplanar pre-form 126.

A step in the process is to at least partially fill the through-hole perforations 114 of the multiplanar pre-form 126 with metal 128 to form a multi-planar metalized pre-form 132.

Metal

Suitable metal for the second filling step includes metals that are capable of forming metal salts, those metal salts are then capable for being deposited by the filling step (described below) onto the metallic lattice 68. Suitable metals include steel (iron), zinc, copper, aluminum, and mixtures thereof, with nickel being preferred. Suitable metal sales include zinc salts, copper salts, aluminum salts, nickel salts, iron salts and mixtures thereof.

Filling

Figure 11:
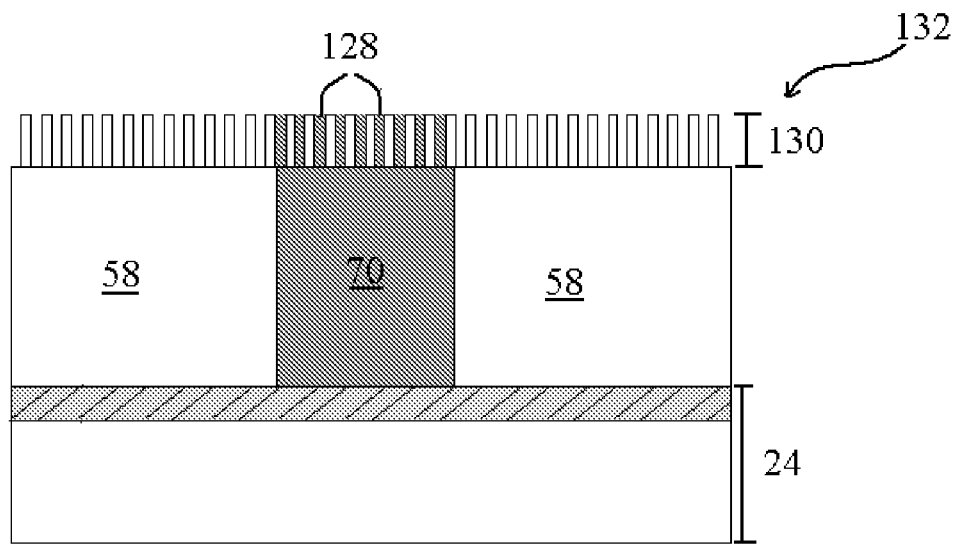
FIG. 11 is an enlarged schematic view of a metalized multiplanar pre-form.

With reference to FIG. 11, at least some of the through-hole perforations 114 are at least partially filled with metal 128 to form a multiplanar metalized pre-form 132. Any suitable process may be used to at least partially fill at least some of the through-hole perforations 114 with metal 128. The second filling step may include a plating process to plate metal into the through hole perforations 114, injecting liquid metal into the through hole perforations 114, casting liquid metal into the through hole perforations 114, or applying a plasma spray of metal might also be utilized, for example, as processes to fill, or partially fill the through hole perforations 114 with metal. A plating process, such as an electroplating process is particularly preferred.

When using an electroplating process, the metallic lattice x-axis segments 70 and metallic lattice y-axis segments 72 of the metalized pre-form 67 are electrically conductive and metal 128 or metal ions from the plating bath will be selectively deposited on the metallized pre-form external surface 80 at the aligned portions of the metallic lattice x-axis segments 70 or the metallic lattice y-axis segments 72 and the through-hole perforations 114. The second engravable material 102 and the discrete formations 58 are not electrically conductive and thus will not give up electrons in the plating bath. Accordingly, no metal will be deposited into the through-hole perforations 114 that are aligned with the discrete formations 58.

As with the previous electroplating step used to make the metalized pre-form 67, the rate of deposition of metal 128 or metal ions into the through-hole perforations 114 will be generally constant and can proceed until the metal thickness 130 in the through-hole perforations 114 reaches the desired amount. The metal thickness 130 in the through-hole perforations 114 may be less than, equal to or greater than the second engravable material thickness 108. In the embodiment of FIG. 11, the metal thickness 130 in the through-hole perforations 114 is equal to the second engravable material thickness 108. Once the through-hole perforations 114 have been filled, or partially filled, with metal 128, it may be necessary or desired to grind the metal 128 to be flush with the second engravable surface outer surface 106.

The steps shown in FIGS. 8-11 can be repeated any number of times as necessary to create a forming screens having the desired cross-sectional profile (aspect ratio).

A step in the process is to remove the engraved second engravable material 102 and the discrete formations 58, resulting in a multiplanar screen precursor 133 comprising a multi-planar metal lattice 134 and a base substrate 24 illustrated in FIG. 11.

In the preferred method, the engraved second engravable material 102 and the discrete formations 58 may be removed by dissolving them it in one or more solvent baths, such as hot perchloroethylene solvent used to dissolve acetal resin. The engraved second engravable material 102 and the discrete formations 58 may be removed melting, cutting away, peeling away, or other manual form of removal of the engraved second engravable material 102 and discrete formations 58 from the metalized multiplanar pre-form 132 to form the multiplanar screen precursor 133.

Figure 12:
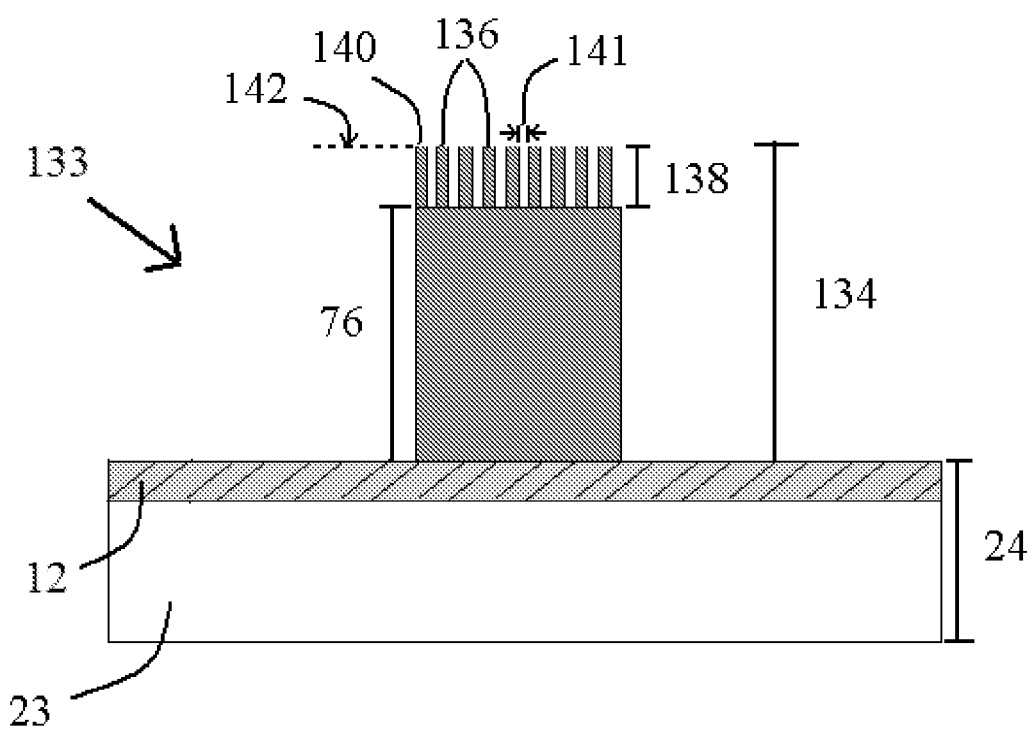
FIG. 12 is an enlarged schematic view of a multiplanar precursor.

The metal 128 that was once contained within the through-hole perforations 114 now forms surface protrusions 136 on the metal lattice external surface 80 at the metallic lattice x-axis segments 70 (and the metallic lattice y-segments 72 not shown). The surface protrusions 136, as seen in this embodiment of FIG. 11, are columnar structures having a protrusion height 138 as measured from the metal lattice external surface 80 to the protrusion distal end 140 and a protrusion width 141 as measured in a direction perpendicular to the height. The surface protrusion height 138 may be generally uniform as shown in FIG. 12 forming a forming screen third plane 142, or may be of various heights. When there are various heights, the "height" may be taken as an average height.

A step in the process is the removal of the metal layer 12 from the multiplanar screen precursor 133 such that the multiplanar metal lattice 134 is separated from the support member 14 or 23 and a multiplanar forming screen results.

Example

In a particularly preferred method, a thin layer of copper metal is applied to a cylindrical plating mandrel. An acetal resin layer (DELRIN®) is then applied to the copper and adhered to the copper using a cyanoacrylate adhesive. The acetal resin layer is then laser engraved to create a continuous, interconnected network of channels that extend all the way through the acetal layer and exposes the copper layer underneath. Discrete island formations of acetal resin remain adhered to the copper layer after this engraving step. The mandrel with the copper layer and engraved acetal layer is then submerged in an electroplating bath whereupon nickel ions are selectively drawn to the copper in the interconnected network, creating a nickel structure resembling a honeycomb or lattice appearance. The structure is then optionally mounted in a lathe to grind the outside diameter plane to a common and essentially uniform diameter. The entire structure is then placed in a bath of hot perchloroethylene to dissolve away the acetal. The structure is then placed in an acid bath to etch away the copper layer and release the nickel lattice from the mandrel.

In a preferred embodiment using the secondary processing steps of FIGS. 8-11, the following sequence can be followed. A thin layer of copper metal is applied to a cylindrical plating mandrel. An acetal resin layer is then applied to the copper and adhered to the copper using a cyanoacrylate adhesive. The acetal resin layer is then laser engraved to create a continuous, interconnected network of channels that extend all the way through the acetal layer and exposes the copper layer underneath. Discrete island formations of acetal resin remain adhered to the copper layer after this engraving step. The mandrel with the copper layer and engraved acetal layer is then submerged in an electroplating bath whereupon nickel ions are selectively drawn to the copper in the interconnected network, creating a nickel structure resembling a honeycomb or lattice appearance. The structure is then optionally mounted in a lathe to grind the outside diameter plane to a common and essentially uniform diameter. A pre-engraved and perforated layer of acetal resin is then applied to the outer surface of the mandrel containing the nickel plating and the acetal islands using cyanoacrylate adhesive. The entire structure is then submerged a second time in an electroplating bath whereupon nickel ions are selectively drawn to the nickel lattice structure, creating secondary metal deposits on the underlying metal structure only. The structure is then placed in a bath of hot perchloroethylene to dissolve away all of the acetal in the outer layer as well as the discrete acetal islands. The structure is then placed in an acid bath which dissolves the copper layer to release the metal lattice from the mandrel.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of making a forming screen, comprising the steps of:
   a) providing a metal layer;
   b) bonding a first engravable material to the metal layer, the first engravable material having a first engravable material inner surface, a first engravable material outer surface, and a first engravable material thickness;
   c) engraving a predetermined pattern into the first engravable material thickness with a collimated energy beam to remove a portion of the first engravable material to form a continuous, interconnected network of channels, the continuous interconnected network of channels comprising a negative space within the first engravable material to expose the metal layer and to create a plurality of discrete formations bonded to the metal layer, thereby creating a pre-form;
   d) at least partially filling the continuous, interconnected network of channels of the pre-form with metal to a predetermined depth, thereby creating a metallized pre-form, the metallized pre-form comprising a metallic lattice, the plurality of discrete formations, the metal layer and a metallized pre-form external surface, the metallized pre-form external surface comprising the metallic lattice and the plurality of discrete formations, the metallic lattice comprising metallic lattice x-axis segments interconnected with metallic lattice y-axis segments and the plurality of discrete formations encompassed by the metallic lattice;
   e) placing a second engravable material in contact with the metallized pre-form external surface to form a multiplanar base substrate, the second engravable material comprising a second engravable material inner surface, a second engravable material outer surface and a second engravable material thickness;
   f) engraving the multiplanar base substrate by engraving the second engravable material with a collimated energy beam to remove a portion of the second engravable material to create a plurality of through-hole perforations that extend through the second engravable material thickness, wherein at least some of the plurality of through-hole perforations are aligned over the metallic lattice to form a multiplanar pre-form;
   g) depositing metal into the multiplanar pre-form at the plurality of through-hole perforations to at least partially fill at least some of the through-hole perforations aligned over the metallic lattice to create a metallized multiplanar pre-form comprising a plurality of protrusions on the metal lattice;
   h) removing the second engravable material from the metallized multiplanar pre-form;
   i) removing the discrete formations from the metallized pre-form to create a screen precursor, the screen precursor comprising the metallic lattice and the metal layer, wherein metallic lattice encompasses a plurality of voids, the voids comprising negative space corresponding to the discrete formations of the metallized pre-form; and
   j) removing the metallic lattice from the metal layer of the screen precursor by etching away the metal layer of the screen precursor, thereby creating a forming screen.

2. The process of claim 1, wherein the metal layer is copper.

3. The process of claim 1, wherein the first engravable material comprises a layer of non-conductive resin and wherein the b) bonding comprises adhering the first engravable material inner surface to the metal layer with and adhesive.

4. The process of claim 1, wherein the c) engraving comprises laser engraving.

5. The process of claim 1, wherein the d) at least partially filling comprises electroplating in a bath containing dissolved nickel salts to at least partially fill the continuous interconnected network of channels to a pre-determined depth with nickel.

6. The process of claim 1, wherein the engravable material comprises an acetal resin and wherein the i) removing comprises dissolving the discrete formations with a solvent.

7. The process of claim 1, wherein the j) removing comprises placing the screen precursor in an acid bath and dissolving the metal layer to release the metal lattice.

8. The process of claim 1, wherein the g) depositing comprises electroplating.

9. The process of claim 1, wherein the h) removing comprises dissolving the second engravable material.

* * * * *